(12) United States Patent
Fu et al.

(10) Patent No.: US 10,466,368 B2
(45) Date of Patent: Nov. 5, 2019

(54) SYSTEMS AND METHODS FOR DETECTOR OUTPUT ADJUSTMENT

(71) Applicant: General Electric Company, Schenectady, NY (US)

(72) Inventors: Geng Fu, Niskayuna, NY (US); Hua Qian, Clifton Park, NY (US); Hao Lai, Niskayuna, NY (US); Jianjun Guo, Niskayuna, NY (US); Adrian Ivan, Niskayuna, NY (US); Brian Yanoff, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/422,833

(22) Filed: Feb. 2, 2017

(65) Prior Publication Data

US 2018/0217275 A1 Aug. 2, 2018

(51) Int. Cl.
*G01T 1/20* (2006.01)
*G01T 1/208* (2006.01)

(52) U.S. Cl.
CPC ............ *G01T 1/2018* (2013.01); *G01T 1/208* (2013.01)

(58) Field of Classification Search
CPC ......... G01T 1/208; G01T 7/005; G01T 1/247; G01T 1/40
See application file for complete search history.

(56) References Cited

U.S. PATENT DOCUMENTS

| 4,323,977 | A | | 4/1982 | Arseneau | |
| 5,432,336 | A | * | 7/1995 | Carangelo | ................ G01J 1/44 250/214 C |
| 8,008,623 | B2 | | 8/2011 | Stein et al. | |
| 8,269,177 | B2 | | 9/2012 | Kim et al. | |
| 8,294,110 | B2 | | 10/2012 | Burr | |
| 8,849,002 | B2 | | 9/2014 | Chinn et al. | |
| 8,884,213 | B2 | | 11/2014 | Grazioso et al. | |
| 2009/0121142 | A1 | | 5/2009 | Heismann et al. | |
| 2012/0228484 | A1 | * | 9/2012 | Burr | ....................... G01T 1/248 250/252.1 |
| 2015/0108328 | A1 | * | 4/2015 | Guo | ...................... H04N 5/361 250/208.1 |

(Continued)

OTHER PUBLICATIONS

Xu et al., "Design and Initial Performance Evaluation of a Novel PET Detector Module Based on Compact SiPM arrays", Nuclear Science Symposium and Medical Imaging Conference (NSS/MIC), 2011 IEEE, pp. 3038-3041, 2011.

(Continued)

*Primary Examiner* — Kenneth J Malkowski
(74) *Attorney, Agent, or Firm* — Joseph F. Harding; The Small Patent Law Group LLC

(57) ABSTRACT

A silicon photomultiplier (SiPM) based detection system includes a plurality of scintillators, SiPMs, a front end circuit, adjustment circuits, and an energy and position processing unit. The SiPMs have a non-linear response to energy deposition corresponding to radiation detection. The adjustment circuit is configured to receive an analog signal from SiPMs, and to provide an adjusted analog signal, which is configured to simulate a signal corresponding to a linear response. The energy and position processing unit utilizes the adjusted signal to provide energy and position information of detected events in the detector block.

18 Claims, 6 Drawing Sheets

(56) References Cited

U.S. PATENT DOCUMENTS

2015/0285922 A1 10/2015 Mintzer et al.
2016/0299240 A1 10/2016 Cho et al.

OTHER PUBLICATIONS

Bieniosek et al., "Effects of SiPM Tultiplexing on Timing Performance", Nuclear Science Symposium and Medical Imaging Conference (NSS/MIC), 2015 IEEE, pp. 1-3, 2015.
Petchakit, W., et al., "Current-mode squaring, square-rooting and vector summation circuits," AEU—International Journal of Electronics and Communications, vol. 64, Issue 5, pp. 443-449 (May 2010) (Abstract).

* cited by examiner

US 10,466,368 B2

SYSTEMS AND METHODS FOR DETECTOR OUTPUT ADJUSTMENT

BACKGROUND OF THE INVENTION

The subject matter disclosed herein relates generally to detection systems and techniques, and more particularly to adjustment of output signals from radiation detectors (e.g., to correct for a non-linear response characteristic).

In certain types of imaging devices, such as positron emission tomography (PET) scanners, arrays of detector elements are used to detect radiation (511 keV annihilation photons) emitting from a radioactive tracer injected into a patient body. The annihilation photons are produced when a positron emitted from a radiopharmaceutical collides with an electron causing an annihilation event. Scintillation crystals receive the annihilation photon and generate light photons in response to the annihilation photon, with the light photons emitted to a photodetector configured to convert the light energy from the light photons to electrical energy.

Solid state photomultipliers, such as a Silicon photomultiplier (SiPM), may be used as photodetector in PET. Solid state photomultipliers provide generally high photon detection efficiency (PDE), low operating voltage (e.g., 30-100 volts), and low sensitivity to magnetic field. However, SiPMs are inherently non-linear (with respect to response at different number of light photons) when designed and operated for high overvoltage and thus high PDE.

In a PET scanner, thousands of light photons generated by a 511 keV annihilation photon in the scintillation crystals may be detected by a SiPM device in a short time duration that is comparable to the recovery time of the SiPM device. The high detection efficiency of light photons necessitates a large dynamic range when the scintillation crystals are directly coupled to the SiPM device. Otherwise, non-linearity of the SiPM device may hinder the recognition of inter-crystal events based on a summed energy, as the readout produced by a single photoelectric event in a single crystal does not equal the summed readout of multiple crystal event (e.g. Compton scatter of K X-ray escape).

BRIEF DESCRIPTION OF THE INVENTION

In accordance with various embodiments, a SiPM based detection system is provided that includes scintillation crystals configured to detect radiation events (e.g. Gamma ray photons or X-ray photons), photodetectors (e.g. SiPM), front end circuit, analog signal adjustment circuit, an energy and position processing unit, and a data acquisition unit. The SiPMs have a non-linear response configured to provide a signal (e.g., a current signal) responsive to the energy deposition caused by detected annihilation photons. The adjustment circuit is coupled to the buffer amplifiers of respective SiPMs, and is configured to receive the analog signal from the SiPM and adjust this analog signal to provide an adjusted analog signal corresponding to a linear response. The energy and position processing unit and data processing unit are coupled to the adjustment circuit and configured to provide energy and position information based on adjusted analog signal.

In accordance with various embodiments, a method is provided that includes detecting radiation events (e.g. 511-keV annihilation photons) with a SiPM based detector that has a non-linear response. The method also includes providing an analog signal of SiPM device to adjustment circuit. Further, the method includes adjusting the analog signal to simulate a signal corresponding to a linear response in analog domain with the adjustment circuit. Also, the method includes processing the energy and position signals after analog adjustment.

DETAILED DESCRIPTION OF THE INVENTION

Figure 1:
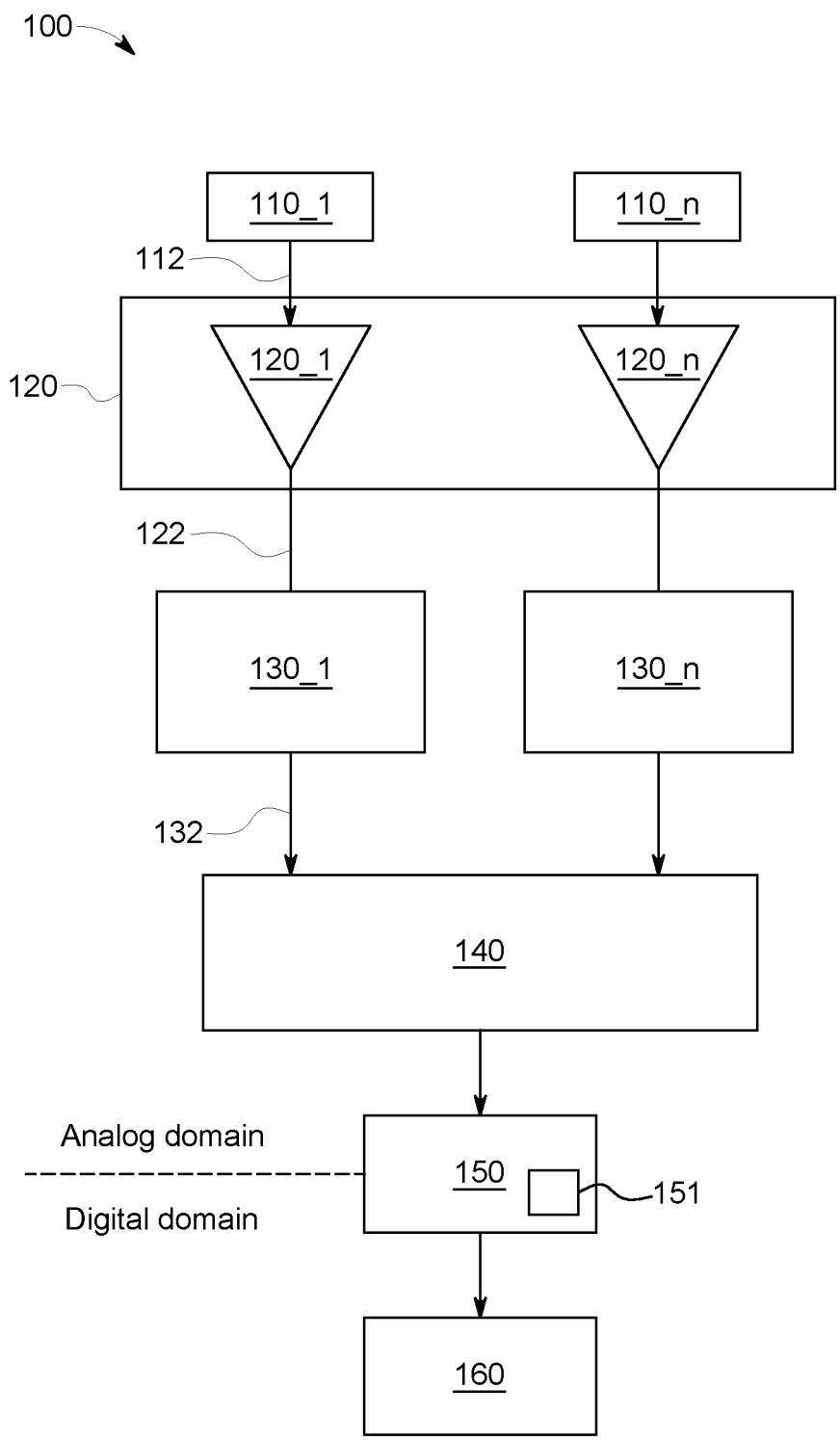
FIG. 1 is a schematic block diagram of a SiPM based detection system in accordance with various embodiments.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," and "module" include a hardware and/or software system that operates to perform one or more functions. For example, a system, unit, or module may include electronic circuitry that includes and/or is coupled to one or more computer processors, controllers, or other logic based devices that perform operations based on instructions stored on a tangible and non-transitory computer readable storage medium, such as a computer memory. Alternatively or additionally, a system, unit, or module may include a hard-wired device that performs operations based on hard-wired logic of the device. The systems, units, or modules shown in the attached figures may represent the hardware that operates based on software or hardwired instructions, the software that directs hardware to perform the operations, or a combination thereof. "Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described herein. Additionally or alternatively, one or more of these devices may be hard-wired with logic circuits to perform these operations. Further, "systems," "units," or "modules" may be configured to execute one or more algorithms to perform functions or operations described herein. The one or more algorithms may include aspects of embodiments disclosed herein, whether or not expressly identified in a flowchart or as a step of a method.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide methods and systems for linearization of SiPM signals. Various embodiments provide linearization to compensate for non-linear signals received from SiPMs in analog domain. Compensating for the non-linear response in the analog domain in various embodiments simplifies the readout electronics, reduces the cost of detection systems (e.g., PET systems), and/or provides accurate energy and position information for detector blocks.

For example, when a 511 keV annihilation photon interacts with a crystal, it may deposit all of its energy in a photoelectric interaction, or, on the other hand, may deposit only part of its energy in a given crystal in Compton scattering. The scattered photon may be detected in a neighboring crystal. Recovering inter-crystal events helps improve the sensitivity of a PET system. The summed energies over two (or more) crystals should add up to 511 keV, or within a predetermined valid energy window (e.g., 425-650 keV). However, detectors with a non-linear response, have outputs biased either higher or lower than the expected energy. If the non-linearity becomes severe enough, the output of measured energy will be degraded. If the non-linearity is too high, then the distortion and compression of the energy spectrum results in the amount of signal output produced in a single crystal not being equal (or close) to the summed output of multiple crystal events (e.g. Compton scatter or K X-ray), causing improper discrimination of inter-crystal events, and degrading the sensitivity of the PET system. Accordingly, various embodiments provide for adjusting non-linear signals.

A technical effect of at least some embodiments provides improved compensation for non-linear responses of SiPM based detectors. A technical effect of at least some embodiments includes reduced cost and/or improved simplification of electronics for detector readout systems. A technical effect of at least some embodiments includes improved system sensitivity (e.g., due to improved detection of inter-crystal events).

FIG. 1 is a schematic block diagram of a SiPM based detection system 100 in accordance with various embodiments. The detection system 100 may be configured for gamma ray photon or X-ray photon detection in various embodiments. As one example, the detection system 100 may be configured for use with positron emission tomography (PET). As another example, the imaging system 100 may be configured for use with single photon emission tomography (SPECT).

As seen in FIG. 1, the SiPM based detector 100 includes a plurality of SiPM devices (110_1 to 110_$n$), a front end circuit (including a plurality of buffer amplifiers (120_1 to 120_$n$)), a plurality of adjustment circuits (130_1 to 130_$n$), an energy and position processing unit, a data acquisition unit 150, and a reconstruction processing unit 160. The non-linear signals from SiPM devices are adjusted in analog domain, and then processed in an energy and position processing unit 140 (e.g., energy (E) and position (X, Z)), which provides an energy signal that is a total energy deposition and at least a two-dimensional position signal that indicates radiation interaction location in the detector block. Then the energy and position signals are digitalized in the data acquisition unit 150.

Generally, the photodetectors provide electric signals in response to received light photons. In the illustrated embodiment, the SiPM 110_1 provides a signal 112 (e.g., an analog current signal) responsive to light photons. The depicted SiPMs 110 have a non-linear response, which, if not accounted for, may adversely affect system sensitivity and thus image quality. The adjustment circuits 130 are coupled to the front-end circuit 120, and are configured to receive the analog signal (e.g., signal 122) from the respective buffers 120 (e.g., buffer amplifiers). The depicted adjustment circuit 130 adjusts the analog signal 122 to provide an adjusted analog signal 132 that simulates a SiPM signal corresponding to a linear response. The adjusted analog signal 132 may be understood as representing a signal that would have been produced by the SiPM 110 if the SiPM 110 had a linear response instead of a non-linear response. The depicted data acquisition system 150 includes one (or more) analog to digital converter (ADC) 151 and is coupled indirectly to the adjustment circuit 130 via the energy and position processing unit 140. The data acquisition system 150 is configured to digitize energy and position information using the adjusted analog signal 132.

As discussed above, SiPM 110 provides the signal 112 responsive to received light photons. It may be noted that in the illustrated embodiment, the depicted block corresponding to the SiPM 110_1 represents a single pixel of photodetector. The blocks 110_1 to 110_$n$ correspond to different pixels in a detector block. Further, the SiPMs 110 may be associated with various additional components. For example, a scintillation crystal block may be employed to detect annihilation photon from an object to be imaged and to produce light photons responsive to the deposited energy. The light photons from the scintillator may then be detected by the respective SiPMs 110 (e.g., a pixel).

Figure 2:
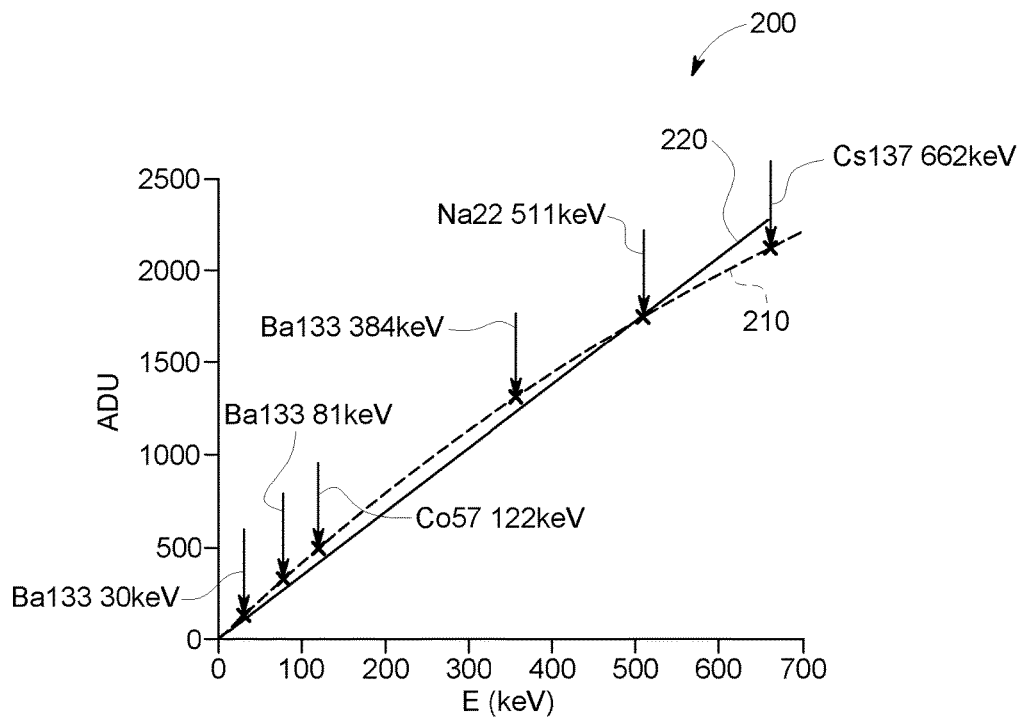
FIG. 2 depicts an example of a non-linear response of a SiPM based detector.

As discussed herein, the SiPMs 110 have a non-linear response. An example of a non-linear response is depicted in FIG. 2. FIG. 2 provides a plot 200, with energy values (in keV) on the x-axis, and output (e.g., current signal at a particular energy) on the y-axis. The plot 200 includes a non-linear response curve 210 depicting a SiPM based detector (e.g., a 3×3×25 mm$^3$ LYSO crystal coupled to a 6×6 mm$^2$ SiPM device) responding to exposure of gamma rays from a variety of radioactive isotopes with their energy levels labeled. The plot 200 also includes a linear response curve 220 normalized with respect to the position of a 511-keV photopeak.

Inter-crystal events where the total energy of an incident annihilation photon is deposited across multiple crystals could be identified by the criteria that the sum of energy depositions detected within a predetermined timing window is within the acceptable energy window (e.g. 425-650 keV). Recovering such events may substantially improve the sensitivity and thus SNR in images. The more the non-linear response curve 210 deviates from the linear response curve 220, the more likely there will be errors in the identification of these inter-crystal events. For example, in the example illustrated in FIG. 2, with very high light output of LYSO (e.g. more than 10,000 light photons generated by a 511 keV annihilation photon), and limited number (~5600) of microcells in the active area of a 3×3 millimeter$^2$ area, the saturation of SiPM output results in more than 10% deviation of actual energy deposition from the expected one by linear fitting in the energy range of 150-350 keV. When 511 keV annihilation photons interact in multiple crystals (e.g., via Compton scattering and/or K-edge X-ray escape), because the non-linear response curve 210 is higher for lower energies, outputs from multiple corresponding SiPMs are biased higher relative to the linear response curve, causing the sum of such energies to be shifted to a higher energy. Accordingly, various embodiments described herein adjust the non-linear response from SiPM device to provide more accurate summed energy for events shared among multiple crystals or detector blocks.

Returning to FIG. 1, the depicted adjustment circuit 130_1 receives the output signal 122 (from front-end circuit 120), and adjusts the analog signal to address a non-linear response of the SiPM device 110_1, and provides the adjusted analog signal 132 as an output of the adjustment circuit 130_1. The adjustment circuit 130_1 is configured to provide the adjustment analog signal 132 to simulate (e.g., match, approximate, or approach) a signal from the SiPM device corresponding to a linear response. For example, the adjustment circuit 130_1 receives analog signal 122 which may correspond to the non-linear response curve 210 of FIG. 2, and provides the adjusted signal 132 that would be obtained from the linear response curve 220. The particular values of the components or portions of the adjustment circuit 130_1 (and/or other adjustment circuits) used to make the adjustments may be determined as part of a calibration process.

Figure 3:
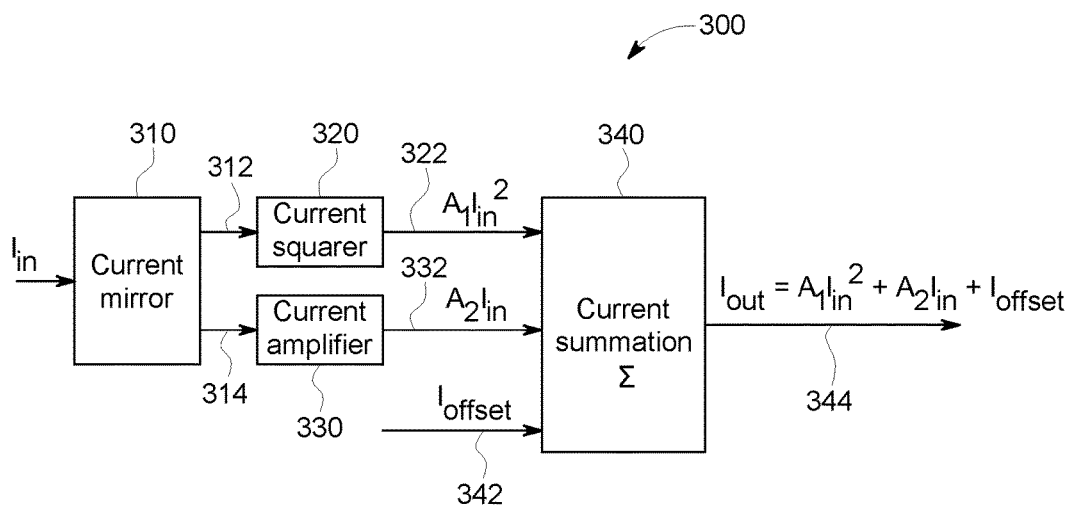
FIG. 3 is a schematic block diagram of an adjustment circuit that may be used to adjust current signal in accordance with various embodiments.

In some embodiments, the signal 112 (e.g., signal from SiPM) and also the output signal of a corresponding buffer amplifier are current signals. FIG. 3 is a schematic block diagram of an adjustment circuit 300 that may be used to adjust a received current signal. The adjustment circuit 300 may be utilized, for example, as the adjustment circuit (e.g., 130_1) in FIG. 1. The adjustment circuit 300 is configured to provide a second order polynomial adjustment to the SiPM signal (e.g., signal 112 or $I_{in}$). As seen in FIG. 3, the adjustment circuit 300 includes a current mirror 310, a current squarer 320, a current amplifier 330, and a current summer 340. The current mirror 310 is configured to receive an input current (e.g., analog signal 122), and provide a first output signal 312 and a second output signal 314, with the first output signal 312 and the second output signal 314 configured to be the same as the input current received by the current mirror 310.

The current squarer 320 receives the first output signal 312 and squares the first output signal 312 to provide a squared signal 322. In the depicted embodiment, the current squarer also provides a gain $A_1$ to the squared signal 322. Accordingly, the output of the current squarer (the squared signal 322) may be represented as $A_1*I_{in}^2$, where $A_1$ is the gain provided by the current squarer 320 also, and $I_{in}$ is the input current signal to the current mirror 310 (and, accordingly, to the current squarer 320).

Figure 4:
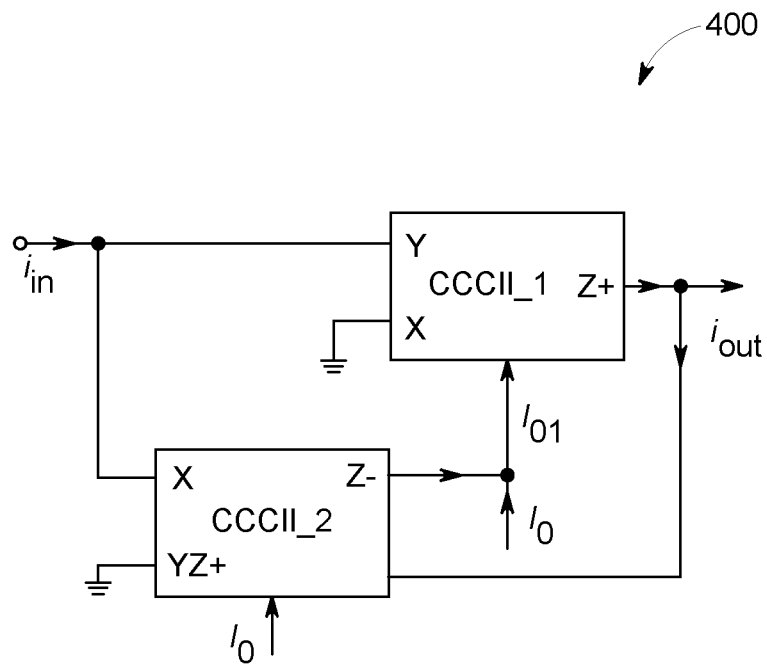
FIG. 4 provides an example of a current squarer that may be employed in conjunction with the adjustment circuit of FIG. 3.

FIG. 4 provides an example of a current squarer 400 that may be employed in conjunction with the adjustment circuit 300. Additional details regarding the current squarer 400 may be found at "Current-mode squaring, square-rooting and vector summation circuits"; AEU—International Journal of Electronics and Communications, Volume 64, Issue 5, May 2010, pages 443-449, which is incorporated herein by reference. Other techniques for squaring current may be employed in various embodiments.

Returning to FIG. 3, the current amplifier 330 receives the second output signal 314 and provides a gain to the second output signal 314 to provide an amplified signal 332. The output of the current amplifier 330 (the amplified signal 332) may be represented as $A_2*I_{in}$, where $A_2$ is the gain provided by the current amplifier 330 and $I_{in}$ is the input current signal to the current mirror 310 (and, accordingly to the current amplifier 330).

The current summer 340 receives the squared signal 322 (e.g., $A_1*I_{in}^2$), the amplified signal 332 (e.g., $A_2*I_{in}$), and an offset signal 342 (e.g., an offset current $I_{offset}$). The depicted current summer 340 receives squared signal 322, amplified signal 332, and offset signal 342 to provide an adjusted analog signal 344 (which may be used as the adjusted analog signal 132). In the depicted embodiment, the adjusted analog signal 344 may be represented as the sum of the received signals. Put another way, $I_{out}=A_1*I_{in}^2+A_2*I_{in}+I_{offset}$, where $I_{in}$ is the input signal (e.g., analog signal 122) and $I_{out}$ is the output signal (e.g., adjusted analog signal 132). Accordingly, the adjustment circuit 300 provides an example of an adjustment circuit that provides a second order polynomial adjustment to an input signal (e.g., analog signal 122). The particular values of the components or portions of the adjustment circuit 300 used to make the adjustments may be determined as part of a calibration process. For example, the values of $A_1$, $A_2$, and $I_{offset}$ may be determined on a pixel-by-pixel basis for each detector pixel (e.g. SiPM). In some embodiments, the calibration process may include determining values of $A_1$, $A_2$, and $I_{offset}$ at various operational conditions (e.g., at different temperatures and/or at different SiPM operating voltages) so that the values of $A_1$, $A_2$, and $I_{offset}$ may be adjusted based on operational condition for improved accuracy.

Figure 5:
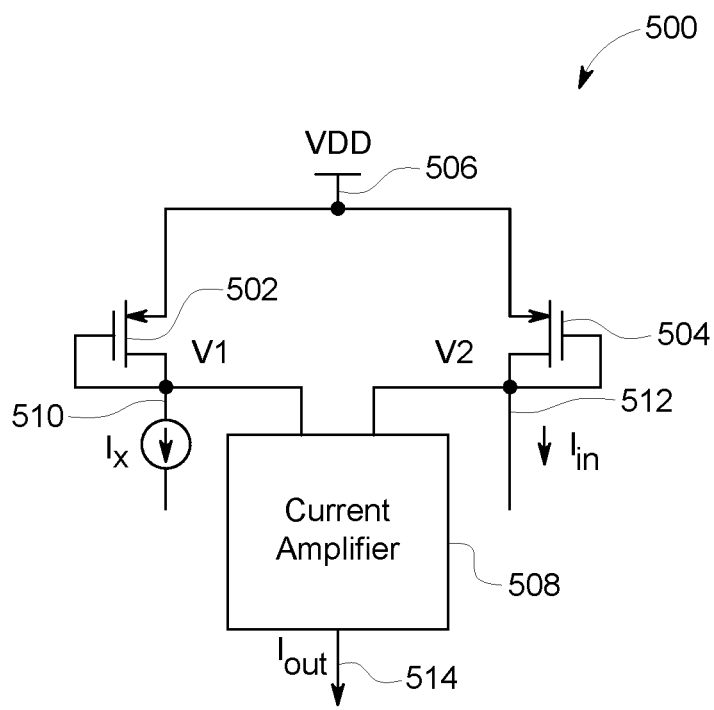
FIG. 5 provides an example of an adjustment circuit that may be used to adjust current signal in accordance with various embodiments.

Other adjustments may be provided in other embodiments. For example, in some embodiments, the adjustment circuit 130 may be configured to provide an exponential adjustment to the analog signal 122. FIG. 5 provides an example of an exponential adjustment circuit 500 that may be employed in various embodiments. As seen in FIG. 5, the exponential adjustment circuit 500 includes a gate 502, a gate 504, a power supply 506, and current amplifier 508. The exponential adjustment circuit 500 receives a first current signal 510 from a current source (e.g., a fixed current source), and a second current signal 512 from a detector pixel (e.g. SiPM device), and provides an output current 514. For the depicted exponential adjustment circuit 500, if the first current signal 510 is fixed, the output current 514 is proportional to the logarithm of the second current signal 512. The amplitude of the output current 514 may be controlled by varying the current amplification ratio (e.g., by varying the gain of current amplifier 508). Accordingly, the adjustment circuit 500 may be configured or programmed to provide desired non-linear correction adjustments.

Figure 6:
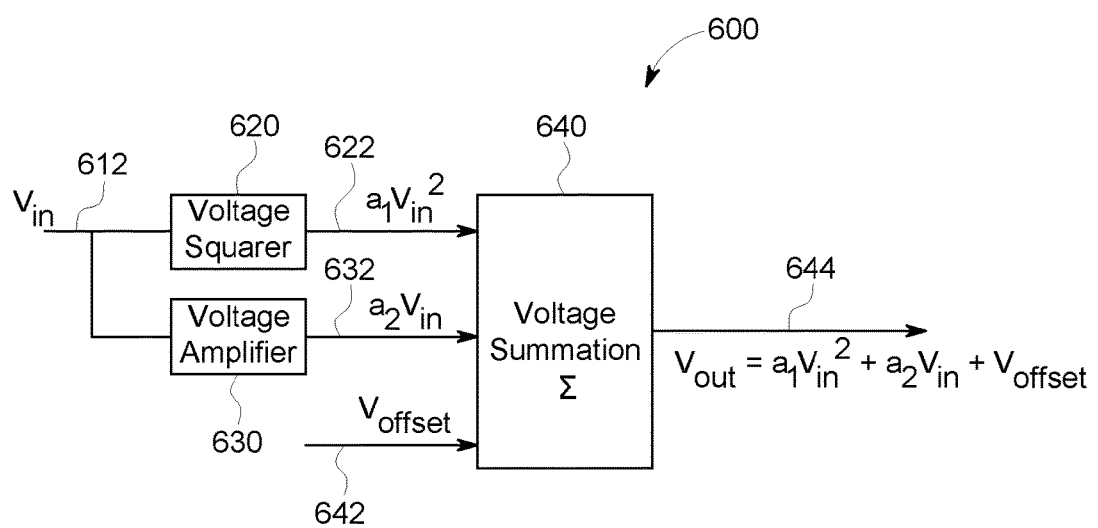
FIG. 6 is a schematic block diagram of an adjustment circuit that may be used to adjust a voltage signal in accordance with various embodiments.

In some embodiments, the output signal of a buffer amplifier (e.g., 120_1) could be a voltage signal. FIG. 6 is a schematic block diagram of an adjustment circuit 600 that may be used to adjust a received voltage signal. The adjustment circuit 600 may be utilized, for example, as an adjustment circuit (e.g., 130_1) in FIG. 1. The adjustment circuit 600 is configured to provide a second order polynomial adjustment to the SiPM signal. As seen in FIG. 6, the adjustment circuit 600 includes a voltage squarer 620, a voltage amplifier 630, and a voltage summer 640. The voltage squarer 620 and the voltage amplifier 630 receive the same input voltage 612 (e.g., output signal of buffer amplifier 122 or $V_{in}$).

The voltage squarer 620 receives the input voltage 612 and squares the input voltage 612 to provide a squared signal 622. In the depicted embodiment, the voltage squarer 620 also provides a gain $a_1$ to the output squared signal 622. Accordingly, the output of the voltage squarer (the squared signal 622) may be represented as $a_1*V_{in}^2$, where $a_1$ is the gain provided by the voltage squarer 620, and $V_{in}$ is the input signal (input voltage 612).

Returning to FIG. 6, the voltage amplifier 630 receives the input voltage 612 and provides a gain to the input voltage 612 to provide an amplified signal 632. The output of the voltage amplifier 630 (the amplified signal 632) may be represented as $a_2*V_{in}$, where $a_2$ is the gain provided by the voltage amplifier 630 and $V_{in}$ is the input voltage signal to the voltage amplifier 630).

The voltage summer 640 receives the squared signal 622 (e.g., $a_1*V_{in}^2$), the amplified signal 632 (e.g., $a_2*V_{in}$), and an offset signal 642 (e.g., an offset voltage $V_{offset}$). The depicted voltage summer 640 combines the received signals (squared signal 622, amplified signal 632, and offset signal 642) to provide an adjusted analog signal 644 (which may be used as the adjusted analog signal 132). In the depicted embodiment, the adjusted analog signal 644 may be represented as the sum of the received signals. Put another way, $V_{out}=a_1*V_{in}^2+a_2*V_{in}+V_{offset}$, where yin is the input signal (e.g., analog signal 122) and $V_{out}$ is the output signal (e.g., adjusted analog signal 132). Accordingly, the adjustment circuit 600 provides an example of an adjustment circuit that provides a second order polynomial adjustment to an input signal. The particular values of the components or portions of the adjustment circuit 600 used to make the adjustments may be determined as part of a calibration process. For example, the values of $a_1$, $a_2$, and $V_{offset}$ may be determined on a pixel-by-pixel basis for each detector pixel (SiPM) (e.g., 110_1 . . . 110_n). In some embodiments, the calibration process may include determining values of $a_1$, $a_2$, and $V_{offset}$ at various operational conditions (e.g., at different temperatures and/or at different SiPM operating voltages) so that the values of $a_1$, $a_2$, and $V_{offset}$ may be adjusted based on real-time operational conditions for improved accuracy.

Returning to FIG. 1, the depicted energy and position processing unit 140 is coupled to the adjustment circuit 130, and is interposed between the adjustment circuit 130 and the data acquisition unit 150. The energy and position processing unit 140 is configured to receive the adjusted analog signal 132 and to provide an energy (E) and at least 2D position (X, Z) signal in an analog domain using the adjusted analog signal 132. It may be noted that the depicted energy and position processing unit 140 may receive adjusted analog signals 132 from a number of different adjustment circuits (e.g., SiPMs and respective buffer amplifiers in a detector block). For example, based on the energy level of a signal as well as the position from which pixels the signal is generated, the given signal may be characterized as a true event or noise; and if a true event, the position signal may be analyzed in the energy and position processing unit 140. In various embodiments, the energy and position processing unit 140 may also be configured to identify events that deposits the energy among multiple pixels.

The output by the energy and position processing unit 140 in the illustrated embodiment is still analog. In the depicted embodiment, these analog signals are provided to the data acquisition system 150, which converts the analog signals to digital signals and provides the energy and position (digital) information of detected radiation events for imaging processing. For example, imaging processing may be performed by the reconstruction processing unit 160 using energy and position information for radiation events generated as discussed herein.

It may be noted that numerous SiPMs 110 may be employed in various embodiments. For example, the SiPM 110_1 represented in FIG. 1 may be understood as a single SiPM device from a detector block, with the energy and position processing unit 140 and data acquisition unit 150 using information from all of the SiPMs. In the illustrated embodiment, the SiPMs 110_1 to 110_n, buffers 120_1 to 120_n, and adjustment circuits 130_1 to 130_n are shown; however, it may be noted in practice that numerous other SiPMs, buffers, and adjustment circuits may be employed.

Figure 7:
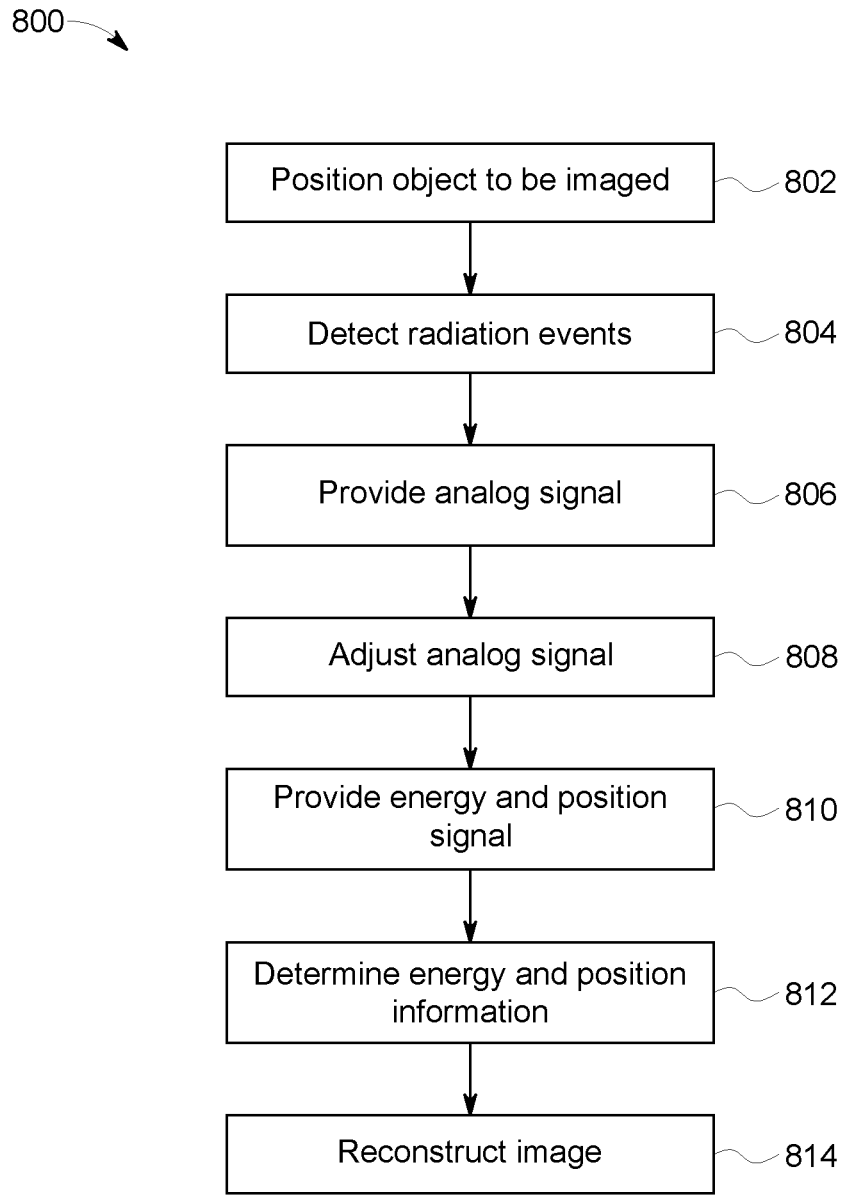
FIG. 7 is a flowchart of a method in accordance with various embodiments.

FIG. 7 provides a flowchart of a method 800 (e.g., for detecting a radiation event, including adjustment compensation for a non-linear response from photodetector) in accordance with various embodiments. The method, for example, may be configured for use with a PET imaging system. In various embodiments, the method may additionally or alternatively be used with other imaging systems, such as a SPECT system, or an energy-resolved photon counting CT system. The method 800, for example, may employ, include, or relate to structures or aspects of various embodiments discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 800 may be used as one or more algorithms (e.g., software modules or other instructions stored on a tangible and non-transitory computer readable medium utilizing or based on the one or more algorithms) to direct hardware (e.g., energy and position processing unit 140 or portion thereof and/or data acquisition unit 150 or portion thereof) to perform one or more operations described herein.

At 802, an object to be imaged is positioned within a scanner. Gamma (or X-ray) photon from the object being imaged is detected by the detector block (scanner). For example, the scan data may be acquired using an emission tomography scanner (e.g., a scintillator based photon counting device), such as a PET scanning system or a SPECT scanning system, among others. An example of an emission tomography scanner or scanning system is discussed herein, for example, in connection with FIG. 7. The scanner in various embodiments includes SiPM based detectors that have a non-linear response as discussed herein. The detectors in various embodiments provide output signals corresponding to energy detected by the detector block. For example, annihilation photons from the object being imaged may be detected by scintillation crystal which produces light photons in response to the energy disposition of annihilation photons, with the light photons received by SiPM devices which produce electric signals responsive to the received light photons.

At 804, radiation events (gamma ray or X-ray photon) are detected in the detector block, For example, in PET imaging, 511 keV annihilation photons from an object to be imaged may be detected by a scintillator block which produces light photons in response, with the light photons received by the photodetector (e.g. SiPM). At 806, an analog signal is provided by the photodetector 110. The photodetector in various embodiments has a non-linear response, for example as discussed in connection with FIG. 2. The analog signal is responsive to the energy deposition of detected radiation events. It may be noted that analog signal may be a current signal in some embodiments, and a voltage signal in some embodiments (e.g., a buffer may receive a current signal as an input and provide a voltage signal as an output).

At 808, the analog signal is adjusted. For example, the analog signal may be adjusted by an adjustment circuit (e.g., adjustment circuit 130, 300, 500, 600) to provide an adjusted analog signal. The adjusted analog signal in various embodiments is configured to simulate a signal from the photodetector corresponding to a linear response. For example, one or more output values from the photodetector corresponding to an output level from the non-linear response curve 210 of FIG. 2 may be adjusted to match or more closely approximate a corresponding output level from the linear response curve 220 of FIG. 2. It may be noted that the adjustment at 808 occurs in the analog domain.

Various different adjustments may be made to the analog detector signal in different embodiments. For example, the signal in some embodiments may be adjusted using a polynomial adjustment (e.g., $2^{nd}$ order polynomial adjustment as described in connection with FIGS. 3, 4, and 6). As another example, in some embodiments, the signal may be adjusted using an exponential adjustment (e.g., as described in connection with FIG. 5). It may be noted that the particular values of coefficients and/or form of mathematical relationship used to make the adjustment may be determined as part of a calibration process (e.g., on a pixel-by-pixel basis), and/or may be varied to account for changes in operating condition (e.g., temperature and/or photodetector operating voltage).

At 810, energy and position (analog) signal is determined using the adjusted analog signal. For example, an energy and position processing unit 140 may provide energy and position signal (e.g., energy level, location, and/or timing of a detected event in the detector block). The energy and location for true event may be identified or determined based on a total energy for a single detected event (e.g., an event that is not shared or distributed among photodetectors and/or crystals), or may be determined by summed energies detected by two or more pixels (e.g., an event that is shared or distributed among photodetectors and/or crystals).

Figure 8:
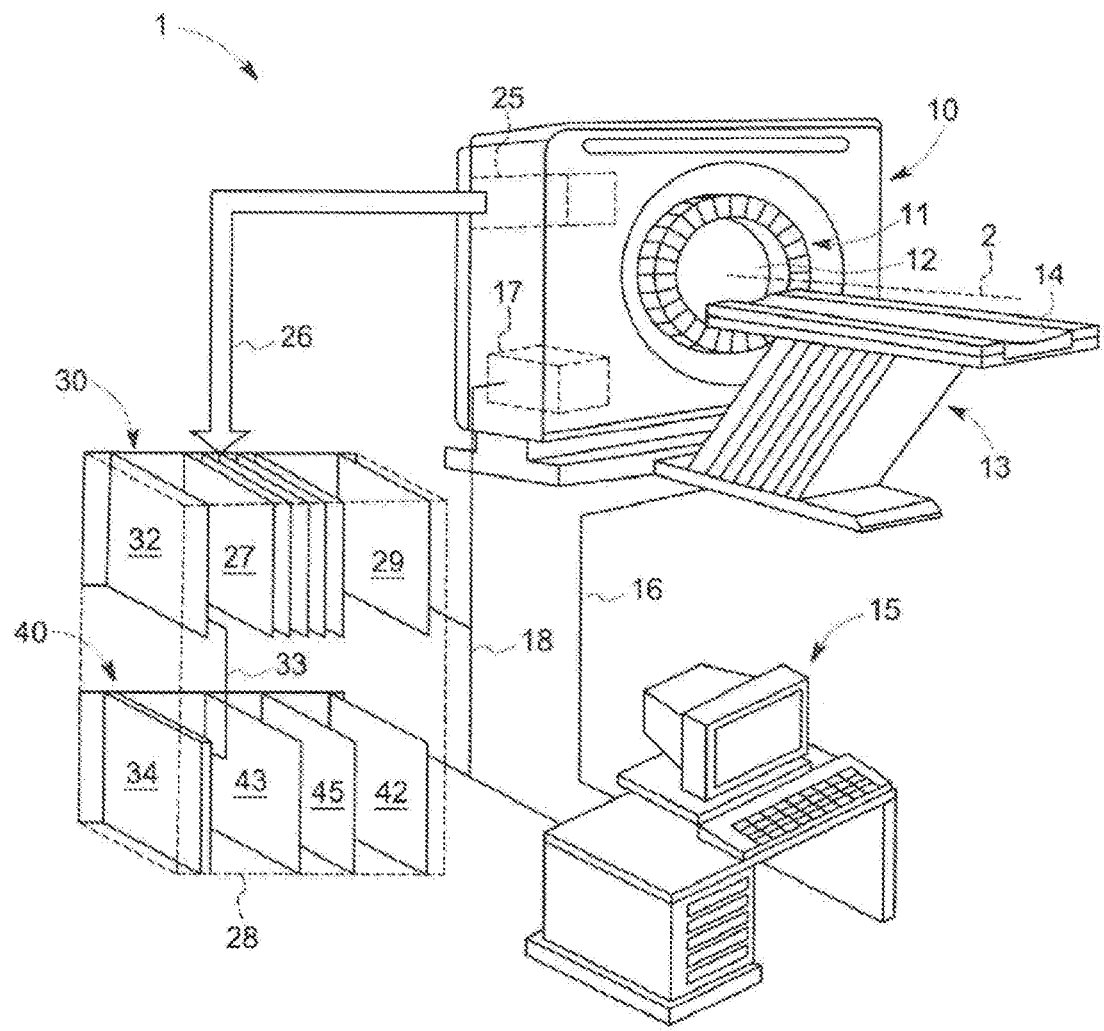
FIG. 8 illustrates an imaging system in accordance with various embodiments.

At 812, the energy and position signal is digitized (e.g., by an ADC in data acquisition system 150), and used to determine energy and position information for detected events. In some embodiments, the energy and position information may be used to reconstruct an image. For example, in the illustrated embodiment, at 814, an image is reconstructed using the determined energy and position information for detected events. FIG. 8 illustrates a PET imaging system with which various embodiments described herein may be employed. In other embodiments, a detection system as discussed herein may be utilized with other imaging systems (e.g., imaging systems configured for one or more additional or alternative modalities). FIG. 8 illustrates a PET scanning system 1 including a gantry 10 that supports a detector ring assembly 11 about a central opening or bore 12. The detector ring assembly 11 in the illustrated embodiments is generally circular and is made up of plural rings of detectors spaced along a central axis 2 to form a cylindrical detector ring assembly. In various embodiments, the detector ring assembly 11 may include 5 rings of detectors spaced along the central axis 2. A patient table 13 is positioned in front of the gantry 10 and is aligned with the central axis 2 of the detector ring assembly 11. A patient table controller (not shown) moves the table bed 14 into the bore 12 in response to commands received from an operator work station 15 through a communications link 16. A gantry controller 17 is mounted within the gantry 10 and is responsive to commands received from the operator work station 15 through a second communication link 18 to operate the gantry.

The detector ring assembly 11 includes a number of detector modules. For example, the detector ring assembly 11 may include 36 detector modules, with each detector module including eight detector blocks, which may include a number of individual scintillation crystals.

As shown in FIG. 8, a set of acquisition circuits 25 is mounted within the gantry 10 to receive signals from the detector block. The acquisition circuits 25 determine timing, energy and the event coordinates within the array of detector crystals using the relative signal strengths. The results are digitized and sent through a cable 26 to an event locator circuit 27 housed in a separate cabinet 28. Each acquisition circuit 25 also produces a timing signal which indicates the exact moment the radiation event is detected in detector block.

The event locator circuits 27 form part of a data acquisition processor 30 which periodically samples the signals produced by the acquisition circuits 25. The data acquisition processor 30 has an acquisition CPU 29 which controls communications on the local area network 18. The event locator circuits 27 assemble the information regarding each valid event into a set of digital numbers that indicated when the event took place and the identity of the detector crystal which detected the event. The event locator circuits 27, for example, may use a detector position map to map a pair of coordinates to the detector which detected the event.

The event data packets are transmitted to a coincidence detector 32 which is also part of the data acquisition processor 30. The coincidence detector 32 accepts the event data packets from the event locator circuits 27 and determines if any two of them are in coincidence. Coincidence may be determined by a number of factors. For example, time markers in each event data packet may be required to be within a specified time period of each other, e.g., 6 nanoseconds. As another example, the locations indicated by the two event data packets may be required to lie on a straight line which passes through the field of view (FOV) in the scanner bore 12. Events which cannot be paired are discarded, but coincident event pairs are located and recorded as a coincidence data packet that is transmitted through a serial link 33 to a sorter 34. The format of the coincidence data packet may be, for example, a thirty-two bit data stream which includes, among other things, a pair of digital numbers that precisely identify the locations of the two detector crystals that detected the event.

The sorter 34, which may include a CPU and which forms part of an image reconstruction processor 40, receives the coincidence data packets from the coincidence detector 32. The function of the sorter 34 is to receive the coincidence data packets and allocate sinogram memory for the storage of the coincidence data. The set of all projection rays that point in the same direction (θ) and pass through the scanner's field of view is a complete projection, or "view", which makes a set of sinogram. The distance (R) between a particular projection ray and the center of the field of view locates that projection ray within the view.

It should be noted that various embodiments may be implemented in hardware, software or a combination thereof. The variety of embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuitry capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A silicon photomultiplier (SiPM) based detection system comprising:

a plurality of scintillation crystals configured to detect radiation events, and to generate light photons responsive to deposited energy;

a plurality of SiPMs having a non-linear response, positioned in respect to one or more of the plurality of scintillation crystals to form a scintillation block and configured to provide an analog signal responsive to received light photons;

a front-end circuit including a plurality of buffer amplifiers, each buffer amplifier coupled to at least one respective SiPM and configured to relay signals from the at least one respective SiPM;

a plurality of adjustment circuits coupled to corresponding buffer amplifiers and SiPMs, each adjustment circuit configured to receive the analog signal from the corresponding SiPM via the front end circuit, and to adjust the received analog signal to provide an adjusted analog signal configured to simulate a signal from the corresponding SiPM corresponding to a linear response, wherein each of the plurality of adjustment circuits provides an accurate summed energy for events shared among at least some of the: plurality of scintillation crystals or plurality of scintillation detector blocks; and an energy and position processing unit coupled to the plurality of adjustment circuits and configured to provide energy and position signals using the adjusted analog signals.

2. The detection system of claim 1, further comprising a data acquisition unit coupled to the energy and position processing unit, and configured to receive the energy and position signals and to determine energy and position information using the energy and position signals.

3. The detection system of claim 2, the data acquisition unit further comprising analog to digital converter (ADC) that is configured to digitize the energy and position signals from the energy and position processing unit, and provide digital energy and position information for data processing.

4. The detection system of claim 2, wherein the energy and position information provides a total energy deposition of detected gamma ray or X-ray photon using adjusted analog signal.

5. The detection system of claim 2, wherein the energy and position information provides at least a two-dimensional position of detected gamma rays or X-ray photons using the adjusted analog signal.

6. The detection system of claim 1, wherein the analog signal comprises at least one of a current signal or a voltage signal.

7. The detection system of claim 1, wherein the output signal of at least one of the SiPMs is a current signal, and a corresponding output signal of a corresponding buffer amplifier comprises at least one of a current signal or a voltage signal.

8. The detection system of claim 6, wherein the adjustment circuit could be configured to provide a polynomial adjustment to a current signal provided by the corresponding buffer amplifier.

9. The detection system of claim 8, wherein the adjustment circuit further comprises:

a current mirror configured to receive and copy the current signal and provide corresponding first and second copied signals;

a current squarer configured to receive the first copied signal and square the first copied signal to provide an amplified squared signal;

a current amplifier configured to receive the second copied signal and provide an amplified signal; and a current summer configured to receive the amplified squared signal, the amplified signal, and an offset signal, and to combine the received signals to provide the adjusted analog signal.

10. The detection system of claim 6, wherein the adjustment circuit is configured to provide an exponential adjustment to a current signal of the corresponding buffer amplifier.

11. The detection system of claim 1, wherein the energy and position information based on adjusted analog signal is used to correct timing information of at least one of the radiation events.

12. The detection system of claim 1, wherein the configuration of the adjustment circuit is determined based on a pixel-by-pixel based calibration process at various operational conditions.

13. The adjustment circuit of claim 12, wherein the operational conditions comprise at least one of a SiPM device condition, an energy of detected gamma or X-ray photon, or crystal configuration.

14. The adjustment circuit of claim 13, wherein the configuration of the adjustment circuit is real-time adjusted based on the operational conditions.

15. A method comprising:

detecting radiation events with scintillation crystals to generate light photons;

receiving the light photons with a silicon photomultiplier SiPM device having a non-linear response;

providing a SiPM signal responsive to receiving the light photons generated in response to the radiation events to an adjustment circuit via front end circuit;

adjusting, in an analog domain, the SiPM signal with the adjustment circuit to provide an adjusted analog signal configured to simulate a signal from the SiPM device corresponding to a linear response, wherein the adjusting comprises providing an accurate summed energy for events shared among at least some of a plurality of scintillation crystals;

providing an energy and position signal using the adjusted analog signal.

16. The method of claim 15, further comprising digitizing the energy and position signal.

17. The method of claim 15, wherein the SiPM signal is a current signal, and a corresponding output signal of the buffer amplifier is at least one of a current signal or voltage signal.

18. The method of claim 15, wherein adjusting the analog signal comprises providing at least one of a polynomial adjustment or an exponential adjustment.

* * * * *